(12) United States Patent
Plester

(10) Patent No.: US 6,444,155 B1
(45) Date of Patent: Sep. 3, 2002

(54) HOLLOW CONTAINERS HAVING A VERY THIN INERT OR IMPERMEABLE INNER SURFACE LAYER BY COATING THE INSIDE SURFACE OF THE PREFORM

(75) Inventor: George Plester, Brussels (BE)

(73) Assignee: The Coca-Cola Company, Atlanta, GA (US)

(*) Notice: Subject to any disclaimer, the term of this patent is extended or adjusted under 35 U.S.C. 154(b) by 0 days.

(21) Appl. No.: 09/168,645

(22) Filed: Oct. 9, 1998

Related U.S. Application Data

(62) Division of application No. 08/694,323, filed on Aug. 8, 1996, now Pat. No. 5,906,787, which is a division of application No. 08/198,572, filed on Feb. 18, 1994, now Pat. No. 5,571,470.

(51) Int. Cl.[7] .................................................. B05D 1/40
(52) U.S. Cl. ..................... 264/255; 156/242; 156/245; 427/358; 118/200; 118/244; 118/407; 118/415; 264/271.1; 264/279.1
(58) Field of Search ................................. 264/446, 478, 264/492, 512, 513, 129, 134, 135, 250, 268, 269, 255, 271.1; 427/358, 430.1; 425/130, 523; 156/242, 245; 118/410, 425, 200, 244, 407, 415

(56) References Cited

U.S. PATENT DOCUMENTS

| 3,564,602 | A |   | 2/1971  | Peck .......................... 264/268 |
| 3,804,663 | A |   | 4/1974  | Clark .......................... 264/512 |
| 3,878,282 | A | * | 4/1975  | Bonis et al. ................... 264/97 |
| 3,947,176 | A | * | 3/1976  | Rainville .................... 425/130 |
| 3,994,649 | A |   | 11/1976 | Valyi |
| 4,047,873 | A |   | 9/1977  | Farrell |
| 4,243,620 | A |   | 1/1981  | Curetti et al. ............... 264/513 |
| 4,264,647 | A |   | 4/1981  | Trevorrow .................. 264/269 |
| 4,281,978 | A | * | 8/1981  | Shigematsu ............. 425/376 B |
| 4,321,029 | A |   | 3/1982  | Aoki |
| 4,401,054 | A |   | 8/1983  | Matsuo et al. |
| 4,478,874 | A |   | 10/1984 | Hahn |
| 4,507,258 | A |   | 3/1985  | Aoki |
| 4,534,930 | A |   | 8/1985  | Nohara |
| 4,569,738 | A |   | 2/1986  | Kieser et al. |
| 4,585,668 | A |   | 4/1986  | Asmussen et al. |

(List continued on next page.)

FOREIGN PATENT DOCUMENTS

| AU | 2693871  | 9/1972  |
| DE | 2041514  | 2/1972  |
| FR | 2312042  | 1/1977  |
| GB | 1482956  | 8/1977  |
| GB | 2117698  | 10/1983 |
| GB | 2138350  | 10/1984 |
| JP | 52072762 | 6/1977  |
| JP | 56049241 | 5/1981  |
| JP | 5971832  | 4/1984  |

OTHER PUBLICATIONS

Patent Abstract of Japan, vol. 10, No. 51 (M–457).
Patent Abstract of Japan, vol. 11, No. 6 (M–551).
Patent Abstract of Japan, vol. 8, No. 180 (M–318).

*Primary Examiner*—Suzanne E. McDowell
(74) *Attorney, Agent, or Firm*—Finnegan, Henderson, Farabow, Garrett & Dunner, L.L.P.

(57) ABSTRACT

A very thin inner layer composed of a polymer chosen for its barrier and/or inertness properties is fabricated within a container preform constructed mainly from another polymer, or a structure of polymers. The inner layer on the preform is produced either by a controlled coating method involving coating of the injection mold core rod prior to injection molding or by a coating applied directly to the preform after injection molding. This enables both inner and main layers to be brought together at a time when the interface between them is molten. A tie layer can be employed, when desirable, to enable the layers to be combined without melting the layer interface.

3 Claims, 3 Drawing Sheets

U.S. PATENT DOCUMENTS

| | | |
|---|---|---|
| 4,599,135 A | 7/1986 | Tsunekawa et al. |
| 4,667,620 A | 5/1987 | White |
| 4,698,234 A | 10/1987 | Ovshinsky et al. |
| 4,714,580 A | 12/1987 | Maruhashi et al. ......... 264/512 |
| 4,715,937 A | 12/1987 | Moslehi et al. |
| 4,737,379 A | 4/1988 | Hudgens et al. |
| 4,744,742 A | 5/1988 | Aoki |
| 4,752,426 A | 6/1988 | Cho |
| 4,756,964 A | 7/1988 | Kincaid et al. |
| 4,797,244 A | 1/1989 | Sauer .................... 264/513 |
| 4,830,811 A | 5/1989 | Aoki |
| 4,888,199 A | 12/1989 | Felts et al. |
| 5,041,303 A | 8/1991 | Wertheimer et al. |
| 5,064,364 A * | 11/1991 | Muller-Erwig .............. 425/114 |
| 5,374,389 A | 12/1994 | Friedrich ................... 264/512 |
| 5,443,767 A | 8/1995 | Cahill ....................... 264/513 |

\* cited by examiner

HOLLOW CONTAINERS HAVING A VERY THIN INERT OR IMPERMEABLE INNER SURFACE LAYER BY COATING THE INSIDE SURFACE OF THE PREFORM

This application is a continuation divisional of copending application Ser. No. 08/694,323, filed on Aug. 8, 1996, now U.S. Pat. No. 5,906,787, which is a divisional application of application Ser. No. 08/198,572, filed Feb. 18, 1994, now U.S. Pat. No. 5,571,470, the entire contents of both of which are hereby incorporated by reference.

BACKGROUND OF THE INVENTION

This invention relates to hollow containers with inert and/or impermeable inner surfaces and, more particularly, to such containers produced by the application of a thin coating either directly to the container preform or to the core rods of the preform injection machine.

Plastic containers have been replacing glass in many applications where easy handling, low weight and non-breakability are needed. To date, polymers have had varying degrees of inertness to the packaged content which differ from the inertness of glass. In the case of plastic food packages, surface inertness helps diminish potential desorption of packaging material components into the food, to prevent flavor absorption, to avoid loss of food constituents through the package walls and to avoid ingress of air or other substances from outside the package.

Refillable plastic packages add a further dimension to inertness requirements because these packages must withstand washing and refilling. Such containers should not absorb contact materials including, inter alia, washing agents and materials stored in the container.

Packages for carbonated beverages are pressurized and must withstand considerable mechanical stress in handling. It is therefore difficult for a single material to provide the necessary mechanical stability and the required inertness.

Current plastic packages for carbonated beverages consist of either a single material, e.g. polyethylene terephthalate (PET), or of multi-layer structures where the middle layers normally provide the barrier properties while the outer layers provide the required mechanical strength.

Multi-layer containers are produced either by coinjection or coextrusion but these processes restrict choice of materials and cannot provide a very thin inner layer.

Therefore, a plastic container with an impermeable, dense, "glass-like" inner surface cannot be produced by conventional methods because these limit the options for the internal surface. Where a plastic, such as high-crystalline PET has good barrier properties but poor transparency, a very thin inner layer is needed so that the transparency of the container as a whole is not impaired. Where a plastic, intended as inner layer, has a different glass transition temperature than the main container material, it cannot be blow-molded unless the inner layer is very thin and can be subjected to individual heat treatment. And, where a barrier plastic has residual monomers or depolymerization by-products, such as acetaldehyde for PET, these can be extracted or deaerated from a very thin layer but not from a thick layer. Accordingly, more polymer options are possible with very thin layer structures.

Recycling is yet another dimension insofar as mass-produced packages are concerned. The reuse of recycled plastic for same purpose, that is to produce new containers ("closed-loop" recycling) is an issue which has attracted much attention, and for PET, this has been achieved to-date by depolymerizing the recycled material in order to free it of all trace contaminants which might otherwise migrate and come in contact with the container content. An impermeable inner layer, which is the purpose of this invention, would enable recycled material to be reused directly for new containers i.e. without special treatment such as depolymerization, since traces of foreign substances could no longer contact the container's content. This would simplify the "closed-loop" recycling process considerably by obviating the need for depolymerization.

Furthermore, recyclability within established recycling systems, both "open-loop", i.e. recycling for other uses, or "closed-loop", i.e. reuse for same purpose, is necessary for any mass-produced package. In "open-loop" systems, the normal method is to separate, clean and chop up the plastic into small flakes. The flake is then either melted and used for molding other objects, or for fibre production. For this form of recycling, it is important to note that any contaminant to the main plastic, such as a coating, should effectively be present in negligible quantities and, preferably, be solid and insoluble within the molten plastic so that it can be filtered off prior to sensitive applications, such as fibre-production. PET is also recycled in "closed-loop" by depolymerization and it is important that the coating material should be unchanged by this process, be insoluble in the monomers resulting from the process, and be easily separable from these monomers. With a correct choice of material, a thin, inner layer can fulfill these criteria.

Finally, since one option available when using a single very thin layer is to use a highly crystalline version of the same polymer as is used in the main part of the container, e.g. highly crystalline PET in PET containers, the inner layer is virtually the same as the outer and recycling presents no problems.

As a result of these inherent limitations, current technology cannot now produce containers with a high barrier inert inner layer having a good appearance because it forces compromises which detract from the desired end result which is an improved beverage container.

SUMMARY OF THE INVENTION

Accordingly, it is the primary object of this invention to fabricate a very thin inner layer composed of a polymer chosen for its barrier and/or inertness properties within a container constructed mainly from another polymer, or same polymer in a significantly more crystalline state, or a structure of polymers.

This and other objects are fulfilled by a method and apparatus for forming a thin inner polymer layer within the preform, then further reducing the thickness of this layer when the container is subsequently formed by stretch blowing. The inner layer on the preform is produced either by a controlled coating method involving coating of the injection mold core rod prior to injection molding or by a coating applied directly to the reheated surface of the preform after injection molding. This enables both inner and main layers to be brought together at a time when the interface between them is molten. Such fabrication offers resistance to subsequent delamination. Additionally, this enables one to use a conventional tie layer, if necessary, and also enables the layers to be combined, where appropriate, without melting the layer interface. Furthermore, this enables use of an inner layer whose glass transition temperature is different from that of the main material in the preform.

Since a very thin layer of polymer is used, the problems of residual monomers, or other extractables, can be resolved by conventional means, such as by deaeration or extraction which is at present far less practicable when the material layer used is thicker, or when the material in contact with the food does not present a good barrier to migration from other layers within the container wall structure. Finally, since some barrier materials have poor transparency, the use of a very thin layer enables transparency problems to be avoided or at least reduced. This invention therefore provides greater flexibility in selecting the material for the inner contact layer of a container on the basis of its barrier properties and inertness, thereby avoiding undesirable compromises which are imposed by the current technology.

BRIEF DESCRIPTION OF THE DRAWINGS

The present invention will become more fully understood from the detailed description given hereinbelow and the accompanying drawings which are given by way of illustration only, and thus, are not limitative of the present invention and wherein.

DETAILED DESCRIPTION OF THE INVENTION

Figure 1:
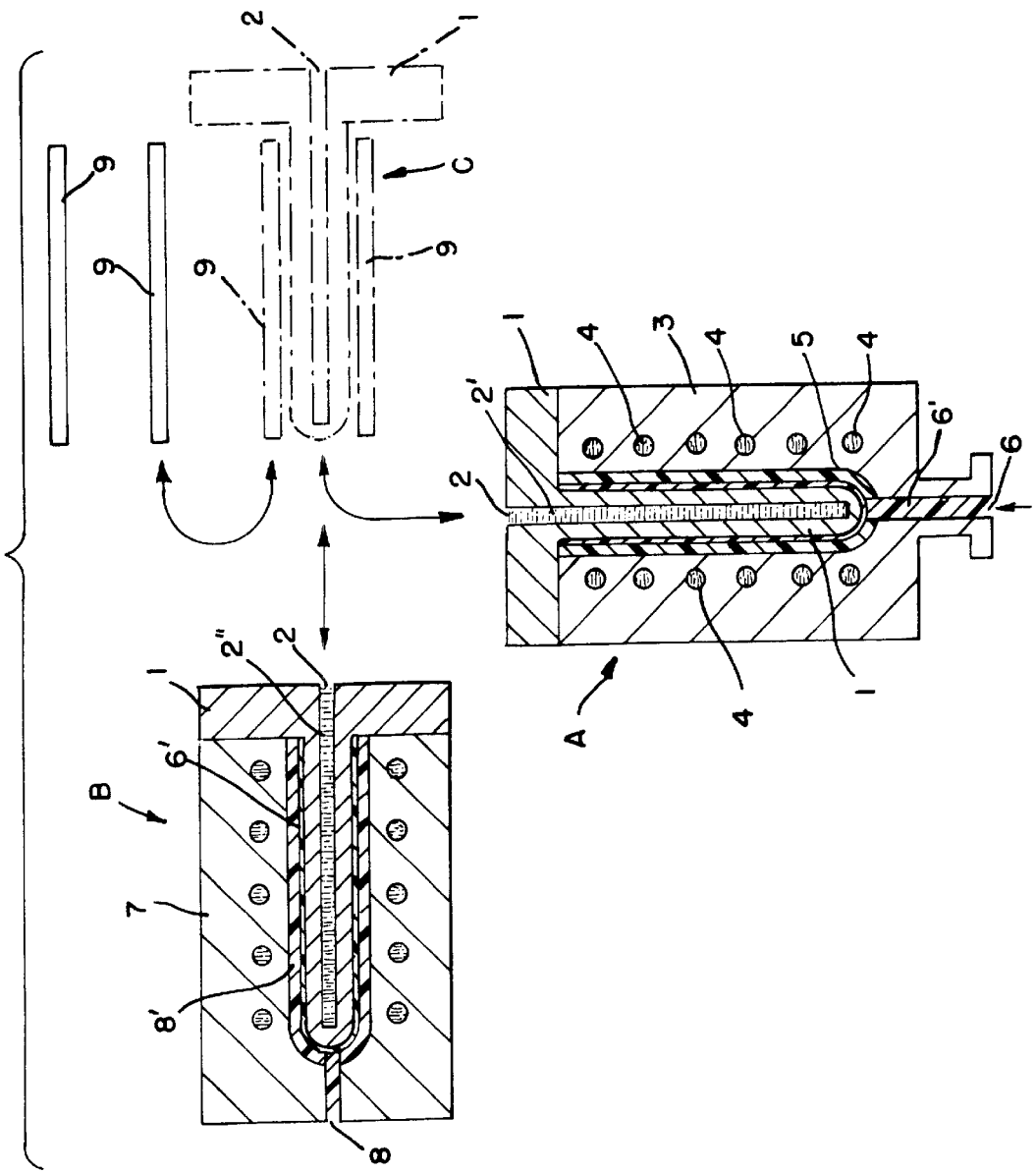
FIG. 1 is a diagrammatic view of a method in accordance with a first embodiment of the present invention.

Referring now to the drawings and more particularly to FIG. 1, shown thereat is a preferred method in accordance with this invention for providing injection molding core rods with a coating of a molten barrier material as an added function of a conventional injection molding machine.

According to FIG. 1, a conventional injection molding core rod 1 is first heated internally at A by passing a heating fluid 2' into the channel 2. A core rod receiver 3 has a plurality of channels 4 and an inner lining 5 of a high temperature, low adhesion polymer, such as polytetrafluoroethylene(PTFE). A heating fluid 4' flows in channels 4. The core rod 1 first enters into the core rod receiver 3. This leaves a small gap between core rod 1 and core rod receiver 3 which is made to reflect the coating thickness required for the core rod. Molten polymer is next fed into an entrance port 6 and fills the gap between the core rod 1 and the core rod receiver 3.

The core rod 1 then exits the core rod receiver 3 with a predetermined coating thickness of molten barrier material 6' and enters the conventional injection cavity mold 7 at B. The flow of heating fluid 2' in channel 2 is then interrupted and a cooling fluid 2" is introduced. The main container molding material 8' is then injected through entry port 8 and flows over the molten barrier material to form a preform with a very thin inner layer comprised of the barrier material 6'.

An alternative to the process described above is to use the core rod receiver 3 at A as a conventional injection mold. In this case, the core rod 1 is first cooled by applying cooling fluid 2" to channel 2 and the core rod receiver 3 is cooled by cooling fluid, not shown, in the channels 4. The core rod 1 then enters into the core rod receiver 3 and molten barrier material 6' is injected through the entrance port 6, filling the gap between core rod 1 and core rod receiver 3. The material in the gap solidifies and core rod 1 withdraws from core rod receiver 3 taking the solidified barrier material 6' as an external sleeve since this adheres to core rod 1 rather than to the inner lining 5.

A heating element 9 is next positioned around the core rod 1 as shown by the phantom lines at C to melt the external skin of the barrier material 6' coating sleeve on core rod 1. The heating element 9 then swings out of the way of core rod 1 which then enters injection cavity mold 7 at B and the main molding material 8' is injected through port 8 to produce the finished preform in the manner described.

If the adhesion between the barrier material 6' used in the inner layer of the preform and the main material 8' of the preform require an adhesive or "tie-layer", which materials are conventionally available for many applications, it can be introduced by using another receiver, not shown, identical to the core rod receiver 3 in parallel therewith. The adhesive material is injected into this additional receiver and the core rod 1, after being coated with either a molten layer of barrier material 6' or with a solid layer 8' in a manner already described, is introduced into the additional receiver so as to receive a coat of adhesive prior to entering injection mold cavity 7 shown at B.

Finally, if an interface adhesive is used, the heating of the sleeve formed around the core rod 1 by heater 9 at C can be avoided depending on adhesive and polymers used.

The process thus described can, when desired, be applied to an injection molding machine having a plurality of core rods 1 and cavity molds 7 by providing a core rod receiver 3 with a plurality of cavities and, if necessary, a plurality of core rod receivers for adhesive.

Figure 2:
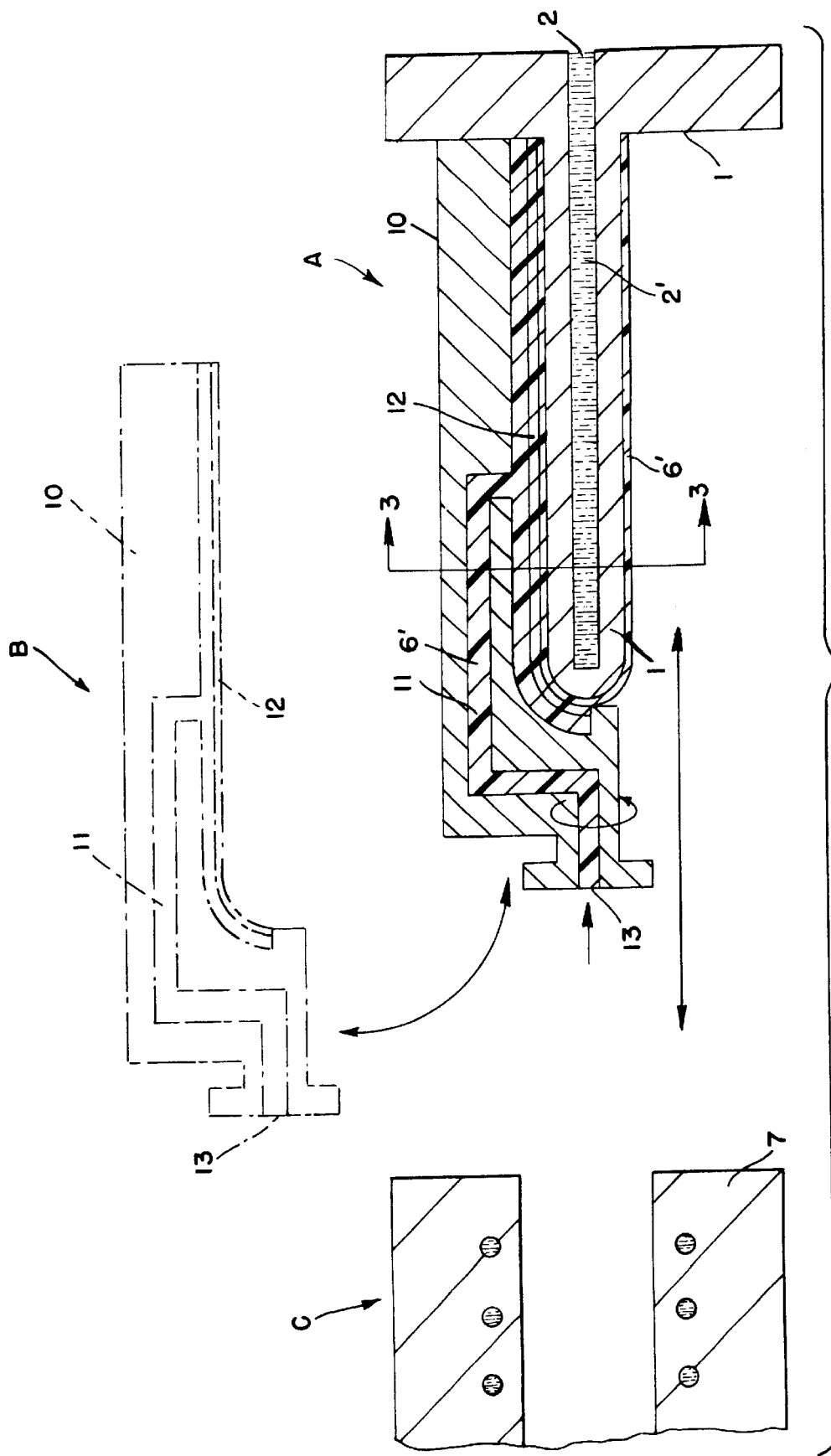
FIG. 2 is a diagrammatic view of an alternative method in accordance with a second embodiment of the present invention.
Figure 3:
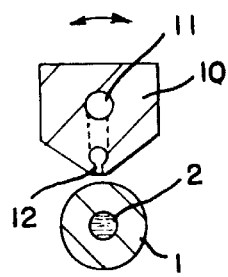
FIG. 3 is a cross sectional view of FIG. 2 taken along the lines 3—3 thereof.

FIG. 2 is illustrative of another method for applying a coating 6' to the core rod 1. As shown, a depositor 10 includes an inner channel 11 and a depositing slot 12. Molten barrier material 6' is fed into port 13 where it flows to a depositing slot 12 as shown in FIG. 3. The depositor 10 can then be swung into position as shown at A and rotated to apply an even coating of molten barrier material 6' around the core rod 1. The internal channel 2 of core rod 1 is supplied with heating fluid 2' to maintain the coating around core rod 1 in a molten state.

The depositor 10 then swings out of the way as shown at B and the core rod 1 enters the injection cavity mold 7 as shown at C where the main molding material, not shown, is injected to produce a finished preform as before.

The depositing slot 12 (FIG. 3) can be adjustable if required to provide an even, controlled layer of deposition on the core rod 1.

If the adhesion between the barrier material 6' used in the inner layer of the preform and the main material 8' of the preform requires an adhesive, not shown, it would be introduced by using a second and identical depositor 10, also not shown. After deposition of the barrier material on the core rod 1, the depositor 10 then swings out of the way and an identical, second depositor, supplied with the adhesive, deposits the adhesive layer prior to the core rod 1 entering the injection molding cavity 7 at C.

This process can be implemented, when desirable, with a multiplicity of core rods 1 and cavity molds 7 by providing a plurality of depositors 10 and, if necessary, a plurality of identical depositors for adhesive.

Although not shown, an alternative to coating the core-rod 1 by using a depositor of the type indicated by FIG. 2 is to coat the inside of the preform 14 (FIG. 4) using a depositing device as in FIG. 2 by dimensionally adapted to enter the preform 14 cavity.

Figure 4A:
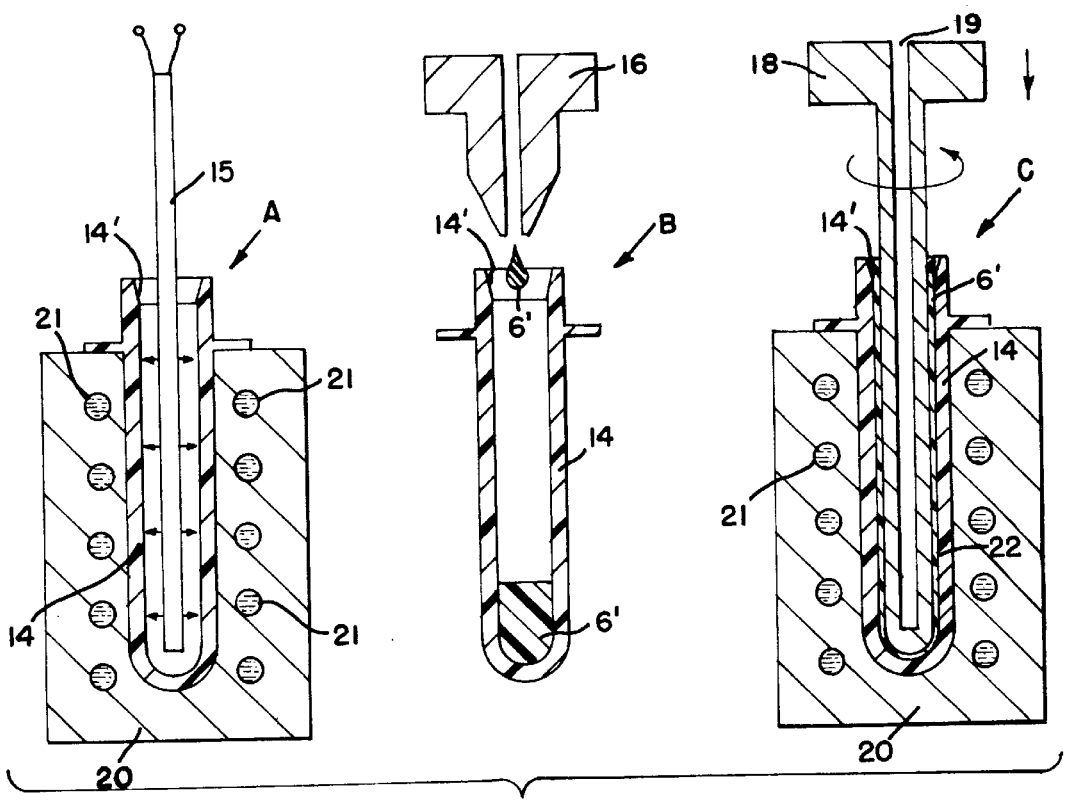
FIGS. 4A–4C are cross sectional views illustrative of a third method of the present invention.

Considering now FIG. 4A, disclosed thereat is a method for applying a thin coating of barrier material 6' directly using a container preform 14. As shown at A, the container preform 14 is inserted into a cooling mantel 20 equipped with cooling channels 21. A radiant heater 15 melts the inner surface of the preform 14 while the main body of the preform 14 is kept cool. At B, the preform 14 is withdrawn from the cooling mantel 20 and a depositor 16 injects an appropriate, accurately metered amount of molten barrier material 6'. At C, a displacement rod 18 having an elongated central channel 19 first enters the preform 14 and displaces the molten barrier material 6' so that it is evenly spread inside the preform 14. If necessary, during this phase, a heating fluid, not shown, can be made to flow in the channel 19.

Figure 4B:
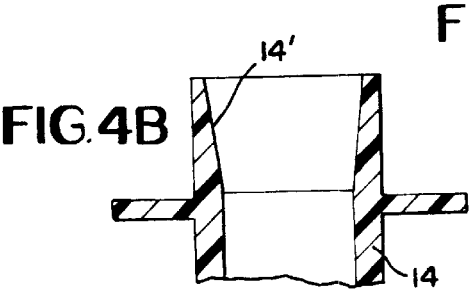
Figure 4C:
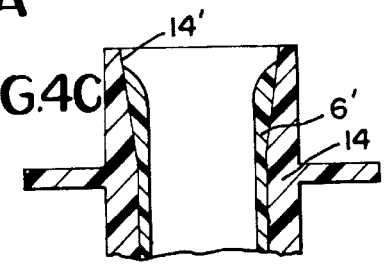

The preform 14 has a slightly tapered inner surface 14' in its topmost area thereby forming a slightly enlarged cavity as shown in FIG. 4B which enables the metering tolerance of molten barrier material 6' to be taken up by allowing this to only partially fill the enlarged cavity at 14'. This effect is illustrated at FIG. 4C. At position C of FIG. 4A, the displacement rod 18 is pressed down hydraulically and can therefore create a very large flow pressure directly in the molten barrier material 6', this being far greater than that which can be generated by conventional injection mold pumping devices. The high pressure thus generated permits even flow of molten barrier material 6' in a very narrow channel formed between displacement rod 18 and preform 14. This in turn enables a very thin inner layer whereas this would not be possible by conventional injection into such a narrow channel, because the very high pressure needed for inducing flow and filling the whole channel would not be practicable using injection mold pumping devices. Furthermore, since the molten barrier material 6' is premeasured to fill the whole channel formed between the displacement rod 18 and the preform 14, with the exception of the partial filling of the enlarged cavity at 14', a greater control of the evenness of the thin inner layer is possible than that provided by conventional injection molding technology, since such conventional technology cannot meter the amount of material entering the mold.

Finally, when desired, the displacement rod 18 can be rotated at a predetermined speed for enabling better radial flow around the channel formed between displacement rod 18 and preform 14, also contributing to coating evenness. Particularly, since molten polymers are generally thyxotropic and reduce their viscosity with applied shear force, the shear force exerted by the rotating displacement rod 18 in the molten barrier material 6' reduces the viscosity and enhances even flow. Additionally, this reduces the hydraulic pressure needed to press the displacement rod 18 into the preform 14. With certain plastics, this shearing action can also enable orientation of the plastic, enhancing its barrier properties, provided the molten barrier material 6' is kept at the appropriate temperature during its displacement.

When the displacement of the molten barrier material 6' is completed, the preform 14 is reinserted into the cooling mantel 20 shown at position A of FIG. 4A and a cooling fluid is switched to flow in place of heating fluid in channel 19. The barrier material 6' now solidifies to form an inner layer 22 within preform 14.

If the adhesion of the barrier material 6' of the inner layer 22 with the main material of the preform 14 requires an adhesive or a "tie layer", this can be introduced in the same manner as described before. This results in an adhesive layer, not shown, between the material of the preform 14 and the inner layer 22. Depending on the adhesive system used, the need to melt the internal surface of the preform 14, as represented at A, may prove unnecessary. This process can, as before, be implemented as shown in FIG. 2 with a plurality of core rods 1 and cavity molds 7 by providing a plurality of heaters 15, depositors 16, and deplacement rods 19. Also, a plurality of blow molding positions can be served by providing a multiplicity of heaters 23 or coolers, if needed, in the same position.

Figure 5:
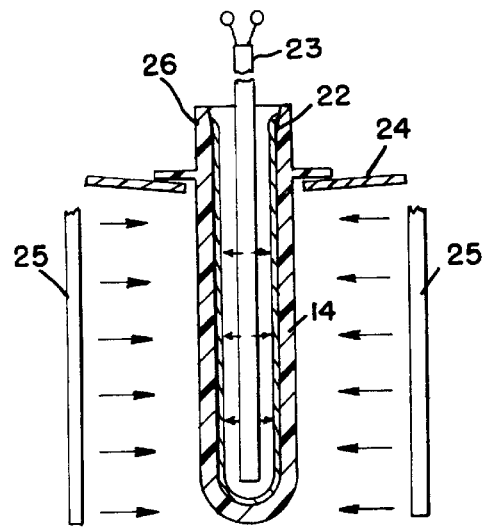
FIG. 5 is illustrative of the pre-stretch blowing reheating apparatus used in connection with the present invention, whenever differential heating is required for the inner layer.

The preform 14 including the barrier layer 22 is now finished and can be passed to a conventional container blowing machine. As shown in FIG. 5, a conventional blow molding machine includes radiant heater elements 25 which operate to raise the temperature of the preform 14 above a glass transition temperature, so that the material of the preform 14 can be stretch blown into a blow mold cavity, not shown. Conventional heat shields 24 are also used to protect the screw threads if formed of the opening 26 of the preform 14.

However, in contrast to conventional pre-blow-molding heat treatment, because the layer 22 of the barrier material 6' within the preform 14 is very thin, it can be provided with a differential heat treatment, thus enabling the use of an inner layer 22 with a different glass transition temperature than preform 14.

To enable differential heat treatment, a radiant heater 23 is added to the conventional equipment and introduced as shown in FIG. 5 to heat the inside of the preform 14 when the inner layer 22 has a higher glass transition temperature than the main material of the preform 14. Alternatively, when the inner layer 22 has a lower transition temperature than the main material of the preform 14, a cooling tube, not shown, is inserted in place of heater 23 to reduce the thermal stress of the thin inner layer 22 within the preform 14.

Having thus shown and described what is considered to be the preferred methods and respective embodiments for implementing the subject invention, it should be noted that all modifications, alterations and changes coming within the spirit and scope of the invention are herein meant to be included.

What is claimed is:

1. A method of fabricating an inner layer of a first polymer within a stretch blown container preform consisting of a second polymer, comprising the steps of:

(a) heating a molding core rod;

(b) rotating a coating depositor having a depositing slot therein around the core rod, and depositing thereon an inner layer of a first polymer while being in a molten state, said first polymer having predetermined barrier and/or inertness characteristic;

(c) removing the depositor from the proximity of the core rod with the inner layer formed thereon;
(d) inserting the core rod into an injection cavity mold;
(e) cooling the core rod; and
(f) feeding a second polymer into the injection mold and flowing the second polymer over the inner layer of said first polymer while the inner layer is still molten to form a preform having an inner layer of barrier material.

2. The method of claim 1 and additionally including another step between steps (c) and (d) of forming a layer of adhesive on said barrier layer.

3. The method of claim 2 wherein said step of forming a layer of adhesive comprises rotating a depositor containing an adhesive around the barrier layer to form an adhesive layer.

* * * * *